US008156053B2

(12) United States Patent
Mika et al.

(10) Patent No.: US 8,156,053 B2
(45) Date of Patent: Apr. 10, 2012

(54) AUTOMATED TAGGING OF DOCUMENTS

(75) Inventors: Peter Mika, Barcelona (ES); Hugo Zaragoza, Barcelona (ES); Massimiliano Ciaramita, Barcelona (ES); Jordi Atserias, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 1006 days.

(21) Appl. No.: 12/118,339

(22) Filed: May 9, 2008

(65) Prior Publication Data

US 2009/0281970 A1 Nov. 12, 2009

(51) Int. Cl.
*G06F 15/18* (2006.01)
(52) U.S. Cl. ......................................... 706/12
(58) Field of Classification Search .................. None
See application file for complete search history.

(56) References Cited

U.S. PATENT DOCUMENTS

| | | | |
|---|---|---|---|
| 7,107,520 B2 * | 9/2006 | Gargi | 715/210 |
| 7,900,133 B2 * | 3/2011 | Cragun et al. | 715/230 |
| 2004/0139059 A1 * | 7/2004 | Conroy et al. | 707/3 |
| 2004/0260702 A1 * | 12/2004 | Cragun et al. | 707/100 |
| 2005/0065958 A1 * | 3/2005 | Dettinger et al. | 707/102 |
| 2005/0262051 A1 * | 11/2005 | Dettinger et al. | 707/3 |
| 2007/0033221 A1 * | 2/2007 | Copperman et al. | 707/103 R |

OTHER PUBLICATIONS

Liddy, Elizabeth D. et al.; "Automatic Metadata Generation & Evaluation"; 2002; ACM New York, NY; SIGIR '02 Proceedings of the 25th annual international ACM SIGIR conference on Research and development in information retrieval; pp. 401-402.*

Flynn, Paul et al.; "Automated Template-Based Metadata Extraction Architecture"; 2007; Springer-Verlag Berline Heidelberg; ICADL '07 Proceedings of the 10th international conference on Asian digital libraries: looking back 10 years and forging new frontiers; pp. 327-336.*

Cantador, Ivan et al.; "Enriching Ontological User Profiles with Tagging History for Multi-Domain Recommendations"; Deposited on Apr. 18, 2008; 1st International Workshop on Collective Semantics: Collective Intelligence & the Semantic Web (CISWeb 2008); pp. 5-19.*

Auer, S. et al. (Nov. 2007). "DBpedia: A Nucleus for a Web of Open Data," *Proceedings of the Sixth International Semantic Web Conference (ISWC 2007)*, Busan, Korea, 14 pages.

Cucerzan, S. (Jun. 2007). "Large-Scale Named Entity Disambiguation Based on Wikipedia Data," *Proceedings of the 2007 Joint Conference on Empirical Methods in Natural Language Processing and Computational Natural Language Learning*, Prague, Czech Republic, Jun. 2007, pp. 708-716.

(Continued)

*Primary Examiner* — David R Vincent
*Assistant Examiner* — Stanley K Hill
(74) *Attorney, Agent, or Firm* — James J. DeCarlo; Greenberg Traurig, LLP

(57) ABSTRACT

An automated technique for tagging documents includes using a semantic tagger to generate an annotation that associates a standard tag with a first text fragment of the user-defined document, wherein the tagger is trained on a standard document annotated with a standard tag, associating the first user-defined tag with a second text fragment of the user-defined document in response to the second text fragment matching a value associated with the first user-defined tag, and establishing a mapping between the standard tag and the first user-defined tag in response to existence of a requisite correlation between the standard tag and the user-defined tag. The technique may further include selecting from the user-defined document a tagged text fragment that is associated with a second user-defined tag, and providing the tagged text fragment and a standard tag associated by the mapping with the second user-defined tag to the tagger as additional training input.

32 Claims, 7 Drawing Sheets

OTHER PUBLICATIONS

Kazama, J. et al. (Jun. 2007). "Exploiting Wikipedia as External Knowledge for Named Entity Recognition," *Proceedings of the 2007 Joint Conference on Empirical Methods in Natural Language Processing and Computational Natural Language Learning*, Prague, Czech Republic, Jun. 2007, pp. 698-707.

Watanabe, Y. et al. (2007). "A Graph-based Approach to Named Entity Categorization in Wikipedia Using Conditional Random Fields," *Proceedings of the 2007 Joint Conference on Empirical Methods in Natural Language Processing and Computational Natural Language Learning*, Prague, Czech Republic, Jun. 2007, pp. 649-657.

Wu, F. et al. (2007). "Autonomously Semantifying Wikipedia," *Proceedings of the ACM Sixteenth Conference on Information and Knowledge Management*, Lisbon, Portugal, Nov. 6-8, 2007, 10 pages.

* cited by examiner

| Token | POS | CONLL | WSJ | Wikipedia |
|---|---|---|---|---|
| Pablo | NNP | B-PER | B-E:PERSON | B-persondata_name |
| Picasso | NNP | I-PER | I-E:PERSON | I-persondata_name |
| was | VBD | 0 | 0 | 0 |
| born | VBN | 0 | 0 | 0 |
| in | IN | 0 | 0 | 0 |
| Málaga | NN | B-LOC | B-E:GPE:CITY | B-persondata-placeOfBirth |
| , | , | 0 | 0 | 0 |
| Spain | NNP | B-LOC | B-E:GPE:COUNTRY | B-persondata-placeOfBirth |

AUTOMATED TAGGING OF DOCUMENTS

BACKGROUND

1. Field

The present application relates generally to associating metadata with content, and, in particular, to automatic tagging of documents using tagging tools that may be trained in subject matter domains different from that of the documents to be tagged.

2. Related Art

Annotation of documents with semantic information, such as tags that categorize words and phrases in the documents into types, is known in the art. Existing computer-based systems such as search engines and databases are generally focused on the literal text content of documents and data. However, meaning, i.e., semantic information, may be attached to specific portions of text in those documents. For example, the word "Paris" in a document may be tagged, i.e., associated or annotated, with a tag that has the value "Location". The tag may then be used in searches, e.g., so that the document can be presented as a search result in a search for locations.

The documents to be annotated may be, for example, web pages and other types of textual content, e.g., the Wikipedia® online encyclopedia. The tags, which may be text strings, may be selected from a set of predefined tags such as categories, e.g., Person, Organization, Location, or any other descriptive label. Tagging may be performed by a human, but such hand-tagging is a slow and labor-intensive process. A tagging tool, referred to herein as a "tagger", processes textual content by selecting tags that correspond to portions of the content. The term "tag" also refers to an operation of selecting a tag to be associated with a portion of content, e.g., with one or more words, and also to the operation of associating the tag with the portion of content. The tagger may be, for example, a statistical tagger that is trained using text documents that have associated typed tags. A tagger trained on particular content and associated tags may be used to tag other content. However, training data for statistical taggers is relatively scarce and is specialized in particular subject-matter domains such as news. The documents to be tagged are often in domains other than the training data. Therefore, it would be desirable to have an automatic system for tagging documents in domains other than the hand-generated training data.

SUMMARY

In one example, a statistics-based semantic tagger is used to tag, i.e., annotate, a user-provided document with tags selected from a set of tags known as a tag set. However, the tags provided by the tag set may not be related to or particularly relevant to the subject matter of the user-provided document, because the semantic tagger is often trained on a particular type of data, such as news articles, and the user-provided document often includes text from a different subject matter, e.g., a subject other than news articles. A metadata-based tagger which deduces tags for the user-defined document based on metadata in the document, e.g., tags from a second tag set that have been associated with the document by users, is then used to annotate the user-provided document with tags selected from the second tag set. Although the first and second tag sets do not necessarily share any common tags or have any explicit relationship to each other, a tagging system is used to establish a mapping table of mappings between the two tag sets by evaluating the correlation between tags in the two tag sets and establishing a mapping, i.e., association, between a tag from the first tag set and a tag from the second tag set by determining, for each pair of tags produced by pairing a tag from the first tag set with a tag from the second tag set, if a requisite correlation exists between the tags from the two tag sets, e.g., the two tags have been associated with the same chunk of text in the user-provided document by both taggers more than a certain number of times. If a requisite correlation exists, then a mapping between the two tags is established.

In one example, the mapping may be used to further train the semantic tagger by providing the portion of text annotated with the tag from the second tag set along with the tag from the first tag set that corresponds to the tag from the second tag set to the semantic tagger as training input. The process may be repeated to further improve the accuracy of the semantic tagger.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 1:
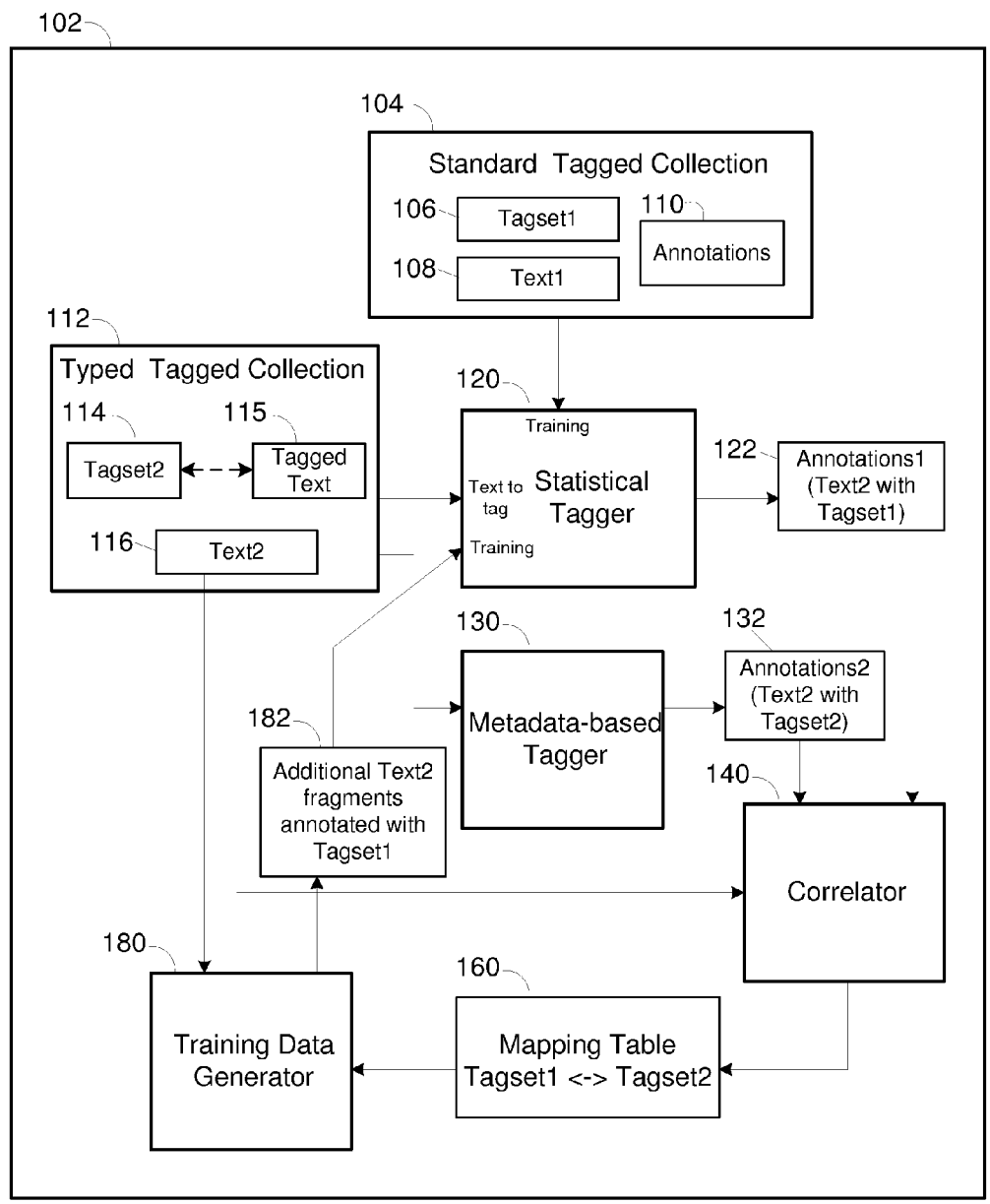
FIG. 1 illustrates an automatic tagging system in accordance with embodiments of the invention.

FIG. 1 illustrates an automatic tagging system 102 in accordance with embodiments of the invention. The tagging system 102 may be implemented as, for example, computer-program code encoded on a computer-readable medium, and includes or invokes a statistical tagger 120. A statistical tagger 120 annotates portions of text 116 with tags selected from a tag set 114 to associate meanings, represented by particular tags, with particular portions of the text 116. The tagging system 102 generates annotations 122 for text 116 using a tag set 114, with the goal of generating annotations that accurately characterize the meaning of associated portions of the text 116. The text 116 may be, for example, Wikipedia® pages, and the tag set may be, for example, Wikipedia properties, which are short text labels associated with a corresponding Wikipedia page and stored in Wikipedia infoboxes.

In an existing technique, a statistical tagger 120 may be used to generate annotations for the text 116 using the tag set 114. The statistical tagger 120 ordinarily requires training on a set of existing annotations of text. Therefore, text 108 associated with tags from a tag set 106 by annotations 110, a combination referred to herein as a standard tagged collection 104, is provided to the statistical tagger 120 as training input prior to using the statistical tagger 120 on the untagged text 116. A standard tagged collection 104 may be, for example, a collection of documents 108 hand-annotated by experts with a standard type-set (i.e., tag set) 106. The hand-annotations are represented in FIG. 1 as annotations 110. In other examples, the annotations 110 may be generated automatically or by non-experts. An example of a standard tagged collection 104 is the BBN Pronoun Entity Type Corpus. A standard type-set 106 may be characterized as, for example, a standardized, curated, concise, consistent, high quality set of semantic word types. An example of a standard type set 106 is the BBN Entity Type Corpus tag set, which defines over 100 categories which are a superset of the standard named entity recognition categories "person", "location", "organization" and "miscellaneous". Note that the term "standard" is used herein to refer to, for example, information that has known characteristics and is, at least initially, provided by or defined by some external entity or organization. The term "standard" does not necessarily refer to a particular industry standard or type of formally standardized entity.

Once the tagger 120 has been trained on a tag set 106 and text 108, the tagger 120 may be used to generate annotations 122 for other text 116. The annotations 122 thus generated associate fragments of the text 116 with tags selected from the tag set 106 that was used in training the tagger 120, according to rules or logic deduced in the training operation.

The quality of the output of the statistical tagger 120 for new text 116 is determined at least in part by the quality of the existing annotations used for training data. High-quality training data for use as the standard tagged collection 104 is relatively scarce because of the substantial effort involved in producing high-quality, i.e., correct and complete, annotations. Human effort, known as hand tagging, is a primary source of high-quality annotations, and the high-quality annotations that are available are ordinarily limited to documents in narrow domains, such as financial and political news, e.g., Reuters or Wall Street Journal articles, which are tagged by humans using defined tag sets 106 to produce annotations 110. Since the training data, i.e., the standard tagged collection 104, is in a domain that is likely to be different from the domain of the text 116 to be tagged, the training of the tagger 120 is ordinarily of limited use for tagging the text 116. The tagger 120 will be substantially limited to the kinds of annotations that existed in the training data, and the quality of the annotations 122 produced by the tagger will be low if the domain or subject matter of the new text 116 is substantially different from the domain of the training text 108.

To address the problem of limited applicability of the statistical tagger 120 to documents outside the domain of the training data, the tagging system 102 generates a second set of annotations 132 for the "new" text 116. The second set of annotations 132 associates tags selected from the second tag set 114 with portions of the new text 116. In one example, the second set of annotations 132 is generated by a metadata-based tagger 130, which accepts a typed-tagged collection 112, in which tags 114 are associated with tagged text strings 115 that are substrings (i.e., portions or fragments) of the new text 116. That is, at least one of the tags in the tag set 114 is associated with a string in the tagged text 115, where the string is a substring of the new text 116. In another example, the tags in the tag set 114 may be directly associated with portions of the new text 116.

A typed-tagged collection 112 is, for example, a collection of textual documents and an associated set of typed-tags, such as Wikipedia or a web site with RDF information. Wikipedia includes pages that correspond to the text 116, and infoboxes that include properties having names and values. Each property name corresponds to a tag in the new tag set 114, and each value (associated with a property name) corresponds to a string in the tagged text 115. An example Wikipedia page about Pablo Picasso may have properties with names "surname" and "birthplace" and respective values "Picasso" and {label="Málaga", label="Spain"}.

A Wikipedia infobox may be described as a consistently-formatted table which is present in articles with a common subject. An infobox is, for example, a set of one or more name-value pairs, and may be thought of as a table that summarizes an associated Wikipedia page. Name-value pairs are also referred to herein as properties. The infobox for a particular subject may be based on a template, which provides for standardization of information across related articles. For example, an infobox Film template may have entries named Name and Director to indicate that an infobox for a Film has those two properties. A Wikipedia page describing a film, e.g., Citizen Kane, may then have an associated infobox with the properties Name=Citizen Kane, Director=Orson Welles.

In one example, a typed-tag is a string of text with an associated type, e.g., Person=John, where "John' is the text, and "Person" is the type. Real world examples of typed-tags can be found in Microformats, which include lists of named values, e.g., N=Orson Welles to identify a person's name, Named Entity lists, which are lists of name-value pairs that identify entities, such as PERSON=Orson Welles, RDF documents, Wikipedia categories, and the like. RDF (Resource Description Framework) is a language for representing information about resources in the World Wide Web, useful for representing metadata about Web resources, such as the title and author of a Web page. A Wikipedia category is a grouping of related pages.

The metadata-based tagger 130, in contrast to the statistical tagger 120, annotates portions of the new text 116 with tags selected from the tag set 114 by identifying strings in the text 116 that match strings in the tagged text 115. The metadata-based tagger 130 annotates each string in the text 116 that matches at least one of the tagged text strings 115 with the new tag, selected from the tag set 114, that is associated with the tagged text string 115. The metadata-based tagger thereby generates the second annotations 132.

The tagging system 102 then establishes a mapping table 160 of mappings between the tag sets of the annotations 122 produced by the statistical tagger 120 and the annotations 132 produced by the metadata-based tagger 130. The mapping table 160 may be represented as, for example, a set of pairs (stdtag, newtag), where each pair represents a mapping, i.e., association, between a standard tag stdtag selected from the standard tagged collection 104 and a new tag newtag selected from the typed tagged collection 112, where a requisite correlation exists in the new text 116 between stdtag and newtag. The degree of correlation is determined based upon the number of times that stdtag and newtag have both been associated with the same portion of text.

In one example, the mapping table 160 may be, for example, an in-memory lookup table or a table in a relational database. A mapping (stdtag, newtag) is added, i.e., admitted, to the mapping table 160 for each pair of annotations (stda, newa), where stda is selected from the standard annotations 122 and newa is selected from the new annotations 132, for which the tag associated with stda, i.e., stdtag, and the tag associated with newa, i.e., newtag, both map to the same string or to substrings of the same string. That is, if the association stda is represented as (stdtag, stdtext), and newa is represented as (newtag, newtext), and stdtext is equal to, i.e., matches, newtext, then a correlator 140 evaluates the correlation between stdtag and newtag and admits the mapping (stdtag, newtag) to the mapping table 160 if a requisite correlation exists. Example conditions under which a requisite correlation exists are described below.

In one example, a mapping is established between a standard tag and a typed tag if a text fragment in the document collection has been annotated with both the standard tag and the typed tag. In other words, a mapping exists between two tags from different sets if both tags have been used to annotate the same text fragment. However, the number of mappings is potentially large, and some mappings may occur multiple times, e.g., because the same tags were applied to multiple (potentially different) fragments of text.

In one example, the correlator 140 determines if a requisite correlation exists as follows. The number of times that a mapping occurs relative to the number of times that other mappings occur may be used as a criterion for selecting mappings that are particularly common. Mappings that satisfy certain criteria are admitted to the mapping table 160. The mapping table 160 may then be used subsequently to generate training data for the tagger. The mapping table 160 establishes a relation between the standard tags and the typed tags, thereby allowing the text in the document collection (e.g., Wikipedia®) that was originally tagged with the typed tags to be fed to the tagger as training input that is (at least indirectly) annotated with the standard tags. The annotation may be indirect, e.g., instead of directly associating the mapped standard tags with the text, the lookup table may be consulted by the tagger, and the corresponding standard tags may be retrieved from the lookup table as needed during execution of the tagger.

As an example of how to determine which mappings between two tag sets may be admitted to the list of mappings, consider the following tag sets $T_a$ and $T_b$:

$T_a$={person, location, organization, misc},
$T_b$={name, born, died, lover}.

In one example, the tag set $T_a$ is a first set of tags that are associated with text fragments in a first set of documents, upon which a tagger has been trained. For example, $T_a$ may be a set of standard tags that have been used to hand-annotate documents such as news articles. Therefore $T_a$ may include tags that correspond to entities often seen in news articles. The tag set $T_b$ may be a second set of tags that are associated with text fragments in a second set of documents. For example, $T_b$ may be a set of tags in a different subject matter domain, such as biographical information found in an online encyclopedia.

An occurrence set is generated for each tag set. Occurrence set A is the set of occurrences of tags in $T_a$, and set B is the set of occurrences of tags in $T_b$. That is, an occurrence corresponds to an association between a tag and a text fragment. As an example, consider the text "Pablo Picasso was born in Málaga, Spain. Dora Maar was the lover and muse of Pablo Picasso." In this example text, there are two occurrences of person (Pablo Picasso, Dora Maar) and an occurrence of location (Málaga, Spain) from set $T_a$. There is also an occurrence of name (Pablo Picasso) and an occurrence of born (Málaga, Spain), and an occurrence of lover (Dora Maar) from set $T_b$. Using a notation of the form "tag (text)" to represent an occurrence of a tag associated with a specified text fragment, the occurrence sets A and B of this example may be represented as follows:

A={person (Pablo Picasso), location (Málaga, Spain), person (Dora Maar)},
B={name (Pablo Picasso), born (Málaga, Spain), lover (Dora Maar)}.

Two tags in different tag sets are said to co-occur if both tags are associated with the same text fragment. The occurrence set A is said to co-occur with a tag $B_i$ in set B if an occurrence in A has the same text fragment as $B_i$.

The correlation between two tags, where each tag is selected from a different tag set, may then be determined based on the number of times the two tags are associated with the same text fragment, i.e., co-occur. Let $A_i$ denote the subset of annotations in A with tag $T_{Ai}$, and similarly let $B_j$ denote the subset of annotations in B with tag $T_{Bj}$. The set of fragments where a particular tag $T_{Ai}$ from $T_a$ and a particular tag $T_{Bj}$ from $T_b$ co-occur may be expressed as $A_i \cap B_j$. Furthermore, the total number of co-occurrences between a particular tag $A_i$ in $T_a$ and tags in $T_b$ may be expressed as:

$$\Sigma_i |A \cap B_i|.$$

The degree of correlation between a tag in $T_a$ and a tag in $T_b$ may be evaluated using the co-occurrence counts described above. In one example, three admission conditions are defined, and a mapping is admitted to the mapping table if all three conditions are satisfied. That is, a requisite correlation exists if all three conditions are satisfied. In other examples, a mapping is admitted if at least one of the conditions, or some combination of the conditions, is satisfied. Therefore, in other examples, a requisite correlation exists if at least one, or a combination, of the conditions is satisfied.

A first admission condition is that the number of co-occurrences for a given tag is greater than a threshold fraction of the total number of co-occurrences. This condition may be expressed by the following formula, where n represents the threshold fraction of the total number of co-occurrences for all tags:

$$\frac{|A \cap B_i|}{\sum_i |A \cap B_i|} > n.$$

A second admission condition is that the total number of co-occurrences is at least a threshold fraction of the number of occurrences in the first occurrence set. This condition may be expressed by the following formula, where k represents the threshold fraction of the number of occurrences in the first occurrence set:

$$\frac{\sum_i |A \cap B_i|}{|A|} > k.$$

A third admission condition is that the number of occurrences is sufficiently large, i.e., greater than a threshold value m. This condition may be expressed by the following formula:

$$|A| > m.$$

The threshold numbers n, k, and m are parameters for which values may be provided. Note that if the first threshold, n, is greater than 0.5, then only one mapping will be admitted per tag.

Continuing with the example introduced above, let us consider possible mappings for tag $T_{A1}$=person. The first admission condition is therefore evaluated as follows.

For $A_1$={person (Pablo Picasso), person (Dora Maar)}, $B_1$={name (Pablo Picasso),}, $A_1 \cap B_{1''}$ is {Pablo Picasso}, and the number of elements in the intersection is 1.

For $B_2$={born (Málaga, Spain), $A_1 \cap B_{2''}$ is empty.

For $B_3$={lover (Dora Maar)}, $A_1 \cap B_{3''}$ is {Dora Maar} and the number of elements in the intersection is 1.

The denominator is the sum of the numbers of elements in the intersections above, i.e., 1+0+1=2.

For tag $T_{B1}$, (name), the first admission condition is ½>n.
For tag $T_{B2}$, (born), the first admission condition is ½>n.
For tag $T_{B3}$, (lover), the first admission condition is ½>n.

The second admission condition uses the sum value from the first condition divided by the number of elements in $A_1$, i.e., 2/2>k.

The third admission condition is that the number of elements in $A_1$ is greater than m, e.g., 2>m.

There is a trade off between precision and recall in the choice of values for the threshold parameters. The optimum mapping is dependent on the kind of costs associated with false positives and false negatives, so selection of values to achieve an optimum mapping involves knowledge of the particular application. For example, values can be chosen for the parameters that are optimal with respect to the goal of improving semantic annotation on a particular corpus, such as Wikipedia®.

In one example, as described above, mappings for which requisite correlation exist are stored in the mapping table 160 that maps tags from the training tag set 106 to tags in the new tag set 114. At this point, the annotations 132 may be mapped to annotations that associate portions of the new text 116 with tags selected from the standard (training) tag set 106 by using the mapping table 160 to identify the standard tag (from the tag set 106) that corresponds to the new tag in the second annotation 132, and creating a mapped annotation that associates the new text in the second annotation 132 with the standard tag of the tag set 106. This mapped annotation may be added to the first annotations 122, or may be provided separately from the first annotations 122.

The quality of annotations generated by the tagger 120 may be improved by training the tagger 120 with additional portions of text 182 annotated with tags selected from the tag set 106. The second (and subsequent) training operations are referred to herein as "retraining". Retraining does not necessarily replace the rules or logic established by the original training, and may augment or extend the rules or logic established by the original training to improve the quality of the tagger's annotations, particularly for text in the same domain as the original text 108 and/or the additional selected portions of text 182.

The tagging system 102 is capable of retraining the tagger 120 with new training data based on the mapping table 160. The retraining operation extends the tagger 120 to the domain of the new text 116. Retraining data 182, which includes annotations of portions of the additional text 116 with tags selected from the training tag set 106, is generated by a training data generator 180. In one example, the training data generator 180 uses the mapping table 160 to look up the new tag of the tag set 114 that corresponds to each standard (i.e., training) tag of the tag set 106, and provides a mapped annotation (newtag, newtext) to the tagger 120 as training input. The procedure of generating retraining data 182 and retraining the tagger 120 can be repeated in order to iteratively improve the mapping and the quality of the additional data from the new domain.

In another example, the training data generator 180 generates the training data 182 by identifying untagged portions of the new text adjacent to the tagged portions, and extending the untagged portions to the left and right to include as many words as possible that are known to be consistently not annotated with any text in the standard tagged collection 104. Each word of the extended untagged portions is then annotated with a null tag, which indicates that the word is not a candidate for tagging. The tagged portion and the adjacent extended untagged portions, which are now tagged with null, are then provided to the statistical tagger 120 as training input 162, thereby retraining the statistical tagger 120. Although the untagged portions are not positively annotated, the negative annotations provide useful information to the tagger 120 by indicating portions of text that are not candidates for tagging.

The training data generator 180 may extend the untagged portions as follows. Suppose, for example, that in the text "Boxmeer is a village in the Netherlands in the province of North Brabant," the portion "North Brabant" has been annotated by the metadata-based tagger 130 with the new tag infobox_city_subdivisionname. Using the [ and ] bracket symbols to enclose the tagged text, the annotation may be represented as:

Boxmeer is a village in the Netherlands in the province of [North Brabant].

The mapping table indicates that the tag infobox_city_subdivisionname corresponds to the standard tag "Location". The portion between the brackets, North Brabant, is a "chunk", i.e., text fragment, that identifies the extent of the data that can be directly used for training. The remaining tokens (i.e., words) in the text may also be entities that may be taggable. In this example, there are two other locations mentioned in the sentence that are unknown to the tagger. In the example thus far, only positive examples have been identified, but identified entities often constitute a minority of the tokens occurring in the text.

In one example, to generate better training data, the chunk is extended to include as much "safe" content as possible, where safe content is content that will not be annotated (or at least is strongly suspected not to be a candidate for annotation). In a conservative approach in which false positives are to be avoided, the standard type collection 104 is used to generate a list of "strong negatives", which are strings that are consistently not annotated with any tag from the standard tag set 106. A no-stop list of strings that will most likely not be annotated is then generated based on the list of strong negatives. The no-stop list may be, in one example, the same as the list of strong negatives. In one example, the no-stop list includes words in the standard training data that are annotated as non-entity labels. For example, if the no-stop list includes the words "in", "the", "province", and "of", the chunk would be extended to the left and right from the initial chunk "North Brabant" to produce Boxmeer is a village in the Netherlands [in the province of North Brabant].

Thus "North Brabant" is tagged with "Location" and the words "in", "the", "province", and "of" are tagged with NULL, where NULL is a value or indicator, such as an empty or null string, indicating that no tag will be associated with the text. In this example, the chunk has been extended to the left, to include "in the province of", because those words are in the no-stop list. The extension stops at (i.e., just before) "Netherlands" because "Netherlands" is not in the no-stop list. Furthermore, if "Netherlands" had been annotated with a tag, the extension would still stop before "Netherlands", because "Netherlands" is associated with a tag, and therefore cannot be non-annotated, i.e., cannot be a non-entity. The extension proceeds to the left and right of the initial tagged chunk, and stops if either the beginning of the string is reached (for extension the left), the end of the string is reached (for extension to the right), or a token not in the no-stop list is reached, or a token that has been previously tagged is reached. The extension process stops just before a terminating (no-stop or tagged) token, and does not include the terminating token itself in the extended chunk. As another example, if the text continues past North Brabant with further words in the no-stop list, then the chunk would have been extended to include those words. Thus, if the text after North Brabant is "with a small population", and the tokens "with" and "a" are in the no-stop list in addition to the no-stop words listed above, but "small" and "population" are not, then the chunk would be extended to the right to include "with a", but would stop just before "small", because "small" is not in the no-stop list.

Boxmeer is a village in the Netherlands [in the province of North Brabant with a] small population.

In that example, "North Brabant" is tagged with "Location" and the words "in", "the", "province", "of", "with", and "a" are tagged with NULL The statistical tagger 120 may be, for example, a tagger that implements a Hidden Markov Model (HMM), a statistical model of sequential structures. In one example, the HMM is trained with the average sequence perception algorithm. The tagger in one example uses a generic feature set for Named Entity Recognition based on words, lemmas, PoS tags, and word shape features. PoS annotations were generated with the same tagger trained on the Wall Street Journal Penn Treebank.

Each of the tags in the tag set 114 may be, for example, a text string, e.g., Person, Location, or any other word(s) that represent a meaning to be applied to portions of text. For example, the tagger 120 may associate the tag Person with the text "Pablo Picasso". The association between a tag and a portion of text is referred to as an annotation. The effectiveness of the tagger 120 may be assessed by evaluating the quality or usefulness of the annotations 122. The annotations 122 involve human language, and their quality may be difficult to measure objectively, since two different people may attach two different meanings or tags to the same portion of text. For example, one person might associate the tag Painter with the text Pablo Picasso, whereas other people might associate the tag Artist or Person with Pablo Picasso. Therefore, in some examples, the tag set 106 may include a relatively small number of distinct tags, such as Person, Location, and Organization.

In one example, the tagger 120 uses rules or other logic to generate the annotations, and these rules or logic may themselves be generated by "training" the tagger 120. The tagger 120 may be trained by supplying a standard tagged collection 104 as training input to the tagger 120. The standard tagged collection 104 includes a tag set 106, text 108, and annotations 110 that associate portions of the text 108 with tags selected from the tag set 106. The standard tagged collection 104 may be, for example, a collection of documents hand-annotated by experts with a standard tag set. In one example, the training data, i.e., the standard tagged collection 104, should include sentences that are completely and consistently annotated with the tags used by an application. An example of a standard tagged collection is the BBN Pronoun Entity Type Corpus.

In one example, the tagger 120 is trained on the manually-labeled training data for named entity recognition, i.e., training data labeled by humans, such as the CoNLL 2003 English NER dataset, which consists of 20,744 English sentences from Reuters data. The text 108 of this corpus has been annotated with tags selected from the tag set {Person, Location, Organization, Miscellaneous}. In another example, the tagger 120 is trained using data of the Wall Street Journal financial news collection, which has been annotated with 108 hierarchically organized tags. These data sets are focused on particular domains, e.g., political and financial news but provide high-quality annotations in terms of completeness, correctness, and consistency in the use of the vocabulary. The tagger achieves good results when training and testing on fractions of the same document collection. For example, the accuracy of the tagger evaluated on held-out CoNLL data is approximately 91% F-score. The tagger implements Viterbi decoding and this is linear in the length of the sentence, and can be used to efficiently tag large amounts of data.

Figures 3, 4:
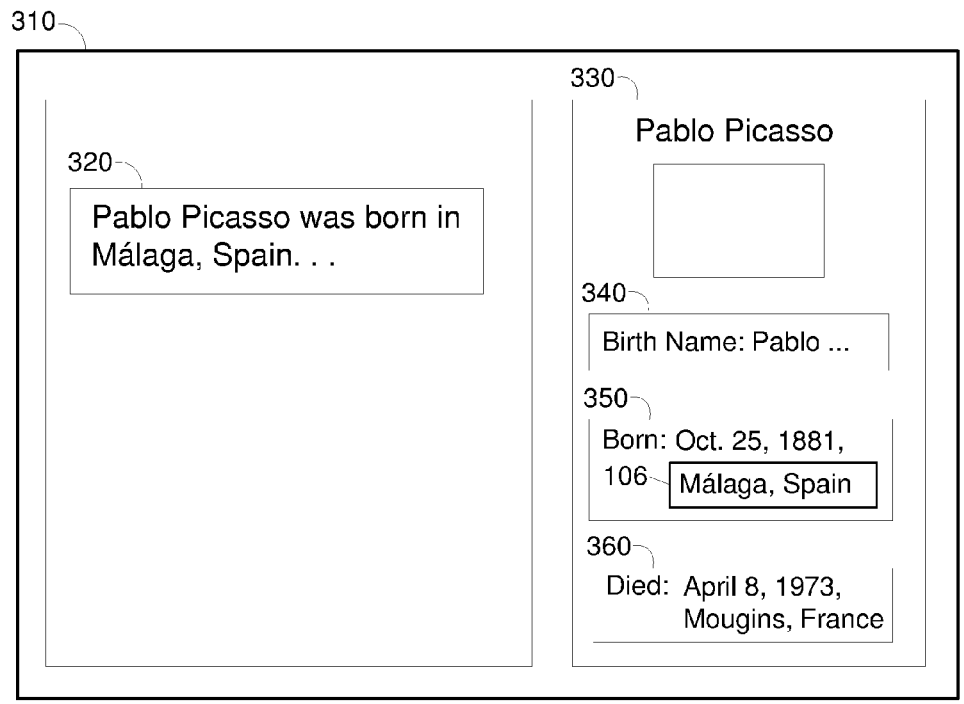
FIG. 3 illustrates a prior art Wikipedia page and infobox.
FIG. 4 illustrates example semantic annotations generated by two different taggers in accordance with embodiments of the invention.

FIG. 4 illustrates example semantic annotations generated by two different taggers in accordance with embodiments of the invention. FIG. 4 shows an example of a tagger's output. In FIG. 4, each column provides annotation for a token according to a given tag set. Annotations spanning multiple tokens are represented by prefixing the tags with either B, to represent the beginning of an annotation, or I, to represent the continuation of an annotation. The columns POS, CONLL, and WSJ have been created by the tagger 120 using three corresponding tag sets (PoS, CoNLL, and Wall Street Journal tag sets), and the last column, showing Wikipedia tags, has been added by a metadata-based tagger 130, which is described below. For example, the token Pablo has been annotated with the PoS tag NNP, the CoNLL tag B-PER, the Wall Street Journal tag B-E:PERSON, and the Wikipedia tag B-persondata_name.

Figure 2:
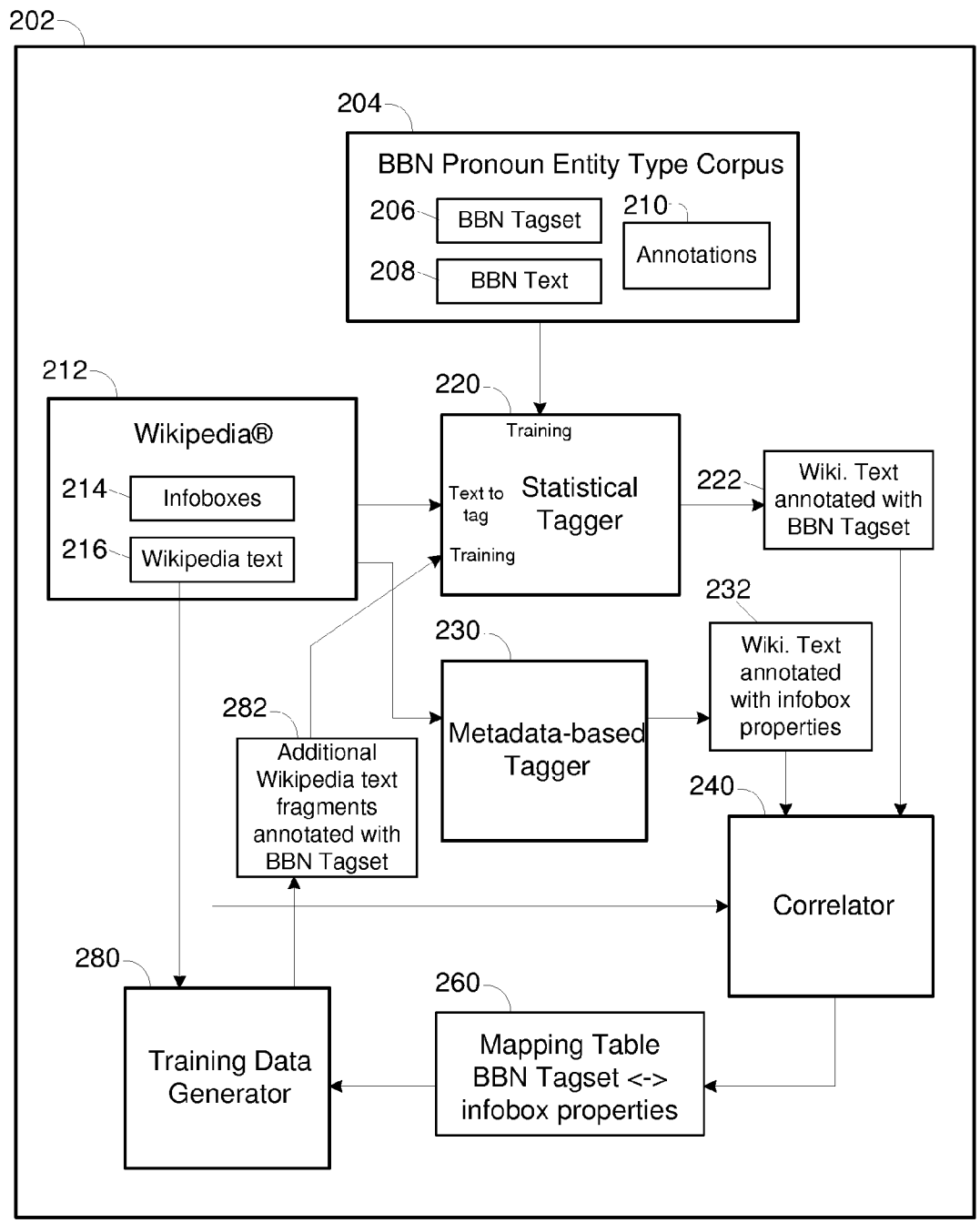
FIG. 2 illustrates an automatic tagging system for tagging Wikipedia® in accordance with embodiments of the invention.

FIG. 2 illustrates an automatic tagging system for tagging Wikipedia® in accordance with embodiments of the invention. A Wikipedia tagging system 202 is similar to the system 102 of FIG. 1, but is specialized for tagging Wikipedia. The standard tagged collection 104 of FIG. 1 is shown in FIG. 2 as a BBN Pronoun Entity Type Corpus 204. Similarly, the typed-tagged collection is shown as Wikipedia 212, which is, for example, a set of Wikipedia pages 216 with infoboxes 214 that associate tags with portions of the text 216. The statistical tagger 220 produces annotations 222 that associate portions of the text 208 with tags selected from the BBN tag set 206. The metadata-based tagger 230 produces annotations 232 that associate portions of the Wikipedia text 216 with tags selected from the infoboxes 216. The association is generated based upon infobox properties that associate portions of the Wikipedia text 216 with infobox property names that used herein as tags. The mapping table 260 thus associates tags selected from the BBN tag set with values selected from the infobox properties. Additional training data 282 thus includes extended chunks of the Wikipedia text 216 associated with tags selected from the tag set 206.

FIG. 3 illustrates a prior art Wikipedia page and infobox. The Wikipedia page 310 includes text 320, "Pablo Picasso was born in Málaga, Spain" and an infobox 330 that summarizes the text 320. The infobox 330 includes a property 340 with the name "Birth Name" and the value "Pablo", a property 350 with the name born and the values Oct. 2, 1881 and "Málaga, Spain" 106, and an infobox 360 with the name Died and the values Apr. 8, 1973 and "Mougins, France". The property name Pablo can be matched with "Pablo" in the text 320 by a metadata-based tagger to tag the word "Pablo" in the text 320 with the tag "Birth Name". The property name "Born" can similarly be matched with the word "born" in the text 320 to tag the words "Málaga, Spain" with the tag "Born".

Figure 5:
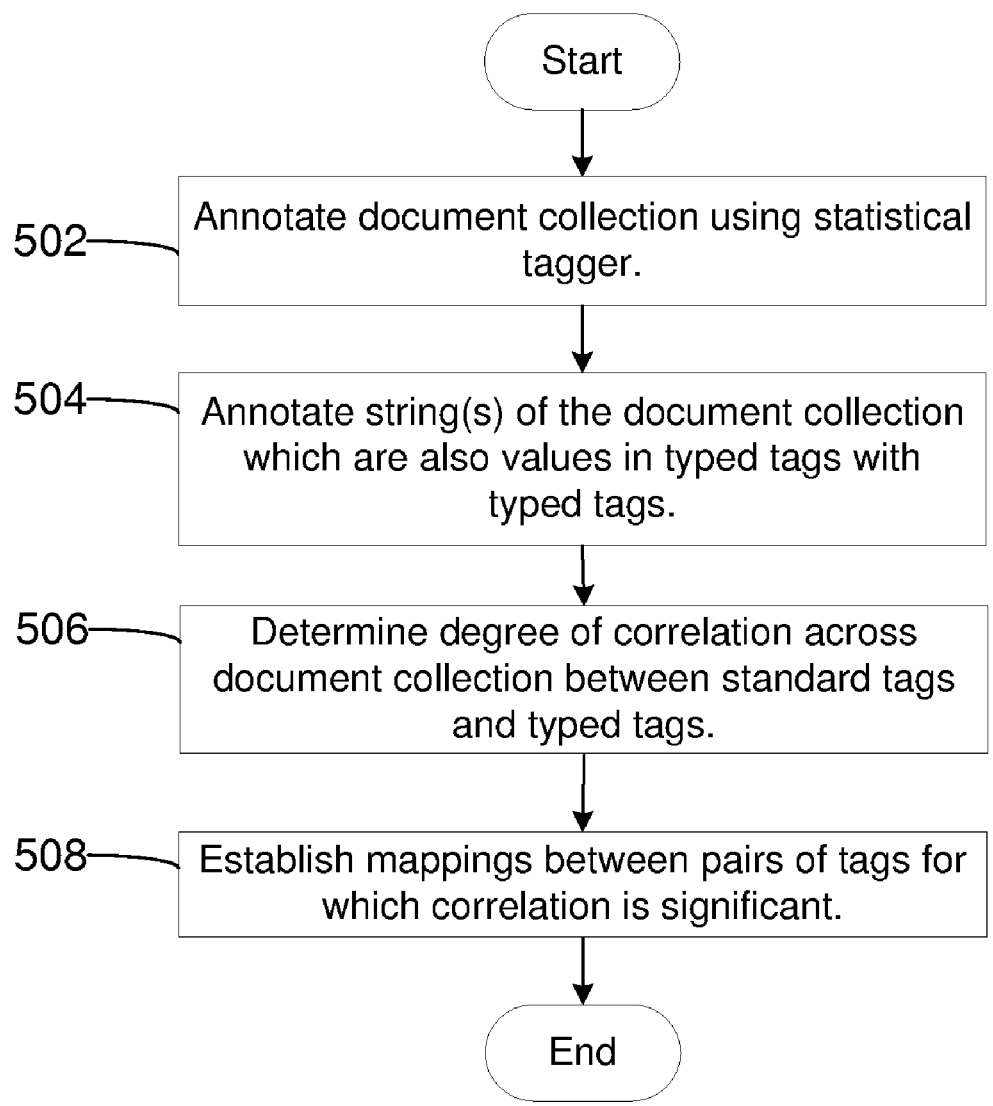
FIG. 5 illustrates a process for annotating strings with two kinds of metadata and generating a mapping between the two kinds of metadata in accordance with embodiments of the invention.

FIG. 5 is an illustrative flow diagram of a process for annotating strings with two kinds of metadata and generating a mapping between the two kinds of metadata in accordance with embodiments of the invention. Block 502 of the process annotates a document collection using a statistical tagger. Block 504 annotates string(s) of the document collection which are also values in the typed tags with the names of the typed tags that correspond to the values. Block 506 determines the degree of correlation across the document collection between the standard tags and the typed tags. Block 508 establishes mappings between pairs of tags for which the requisite correlation exists. The details of each block are similar to corresponding operations of the tagging system 102 described above with reference to FIG. 1.

Figure 6:
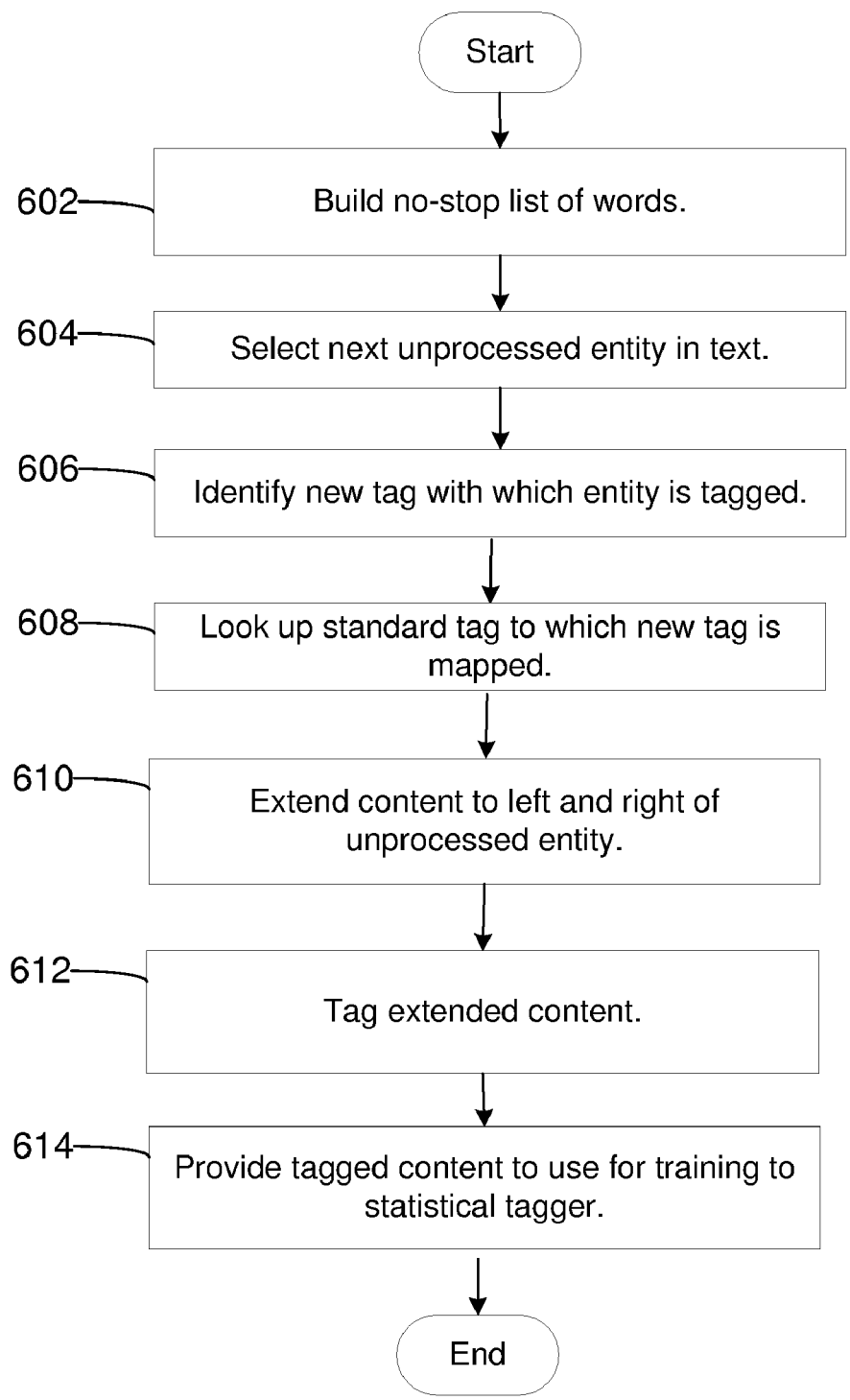
FIG. 6 illustrates a process for generating training data for a tagger in accordance with embodiments of the invention.

FIG. 6 is an illustrative flow diagram of a process for generating training data for a tagger in accordance with embodiments of the invention. Block 602 builds a no-stop list of words or tokens based on a standard tagged collection 104. Block 604 selects the next unprocessed entity in the text to be tagged, e.g., reads in the next token from an input document, and continues on to the next document in the document collection when the end of a document is reached. Block 606 identifies the "new" tag, i.e., the tag from the typed-tagged collection's tags 114 with which the next unprocessed entity is tagged. Block 608 looks up the "standard" tag, i.e., the tag from the standard tagged collection's tags 106 to which the new tag is mapped by the mapping table 160. Block 610 adds words, i.e., tokens, that are located to the left or right of the unprocessed entity to generate an extended chunk of text that includes words that are either directly adjacent to the unprocessed entity, or are separated from the unprocessed entity only by no-stop words or whitespace or punctuation. A no-stop word is, in one example, a word that is in the no-stop list. Block 612 tags the unprocessed entity with the standard tag identified in block 608 and tags the other words in the extended chunk of text with NULL. Block 614 provides the tagged content generated in block 612 to the statistical tagger as training input.

Figure 7:
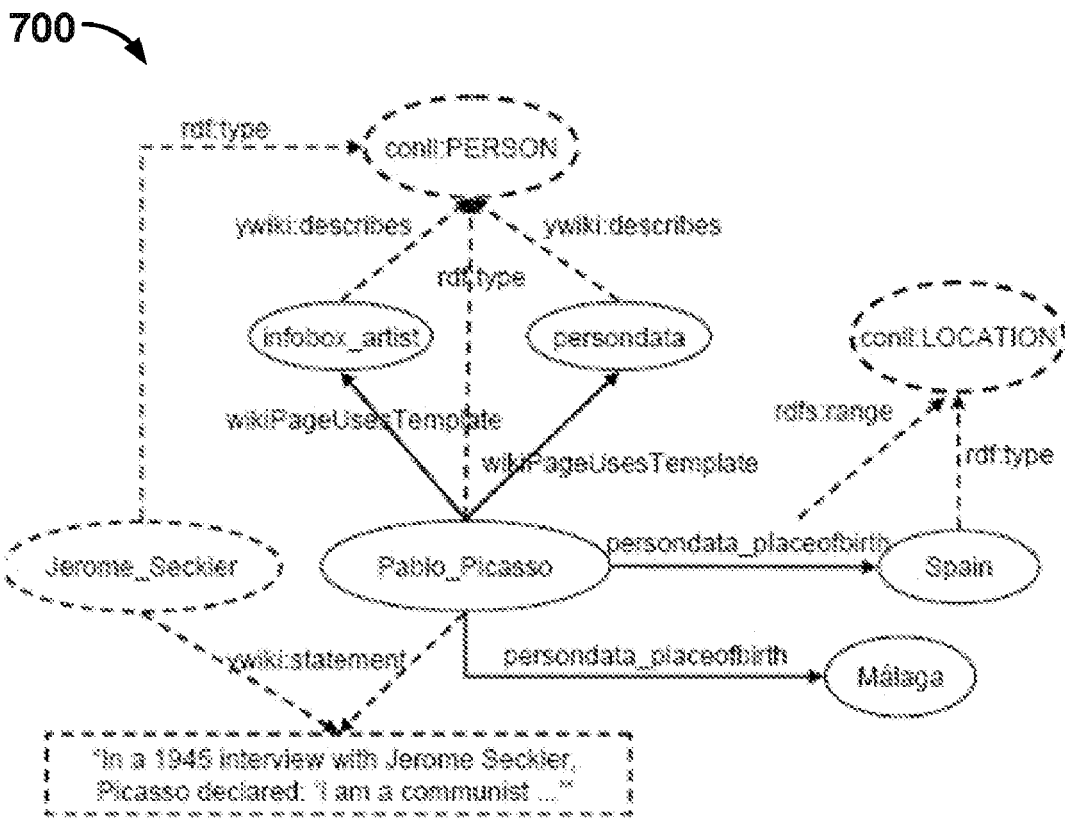
FIG. 7 illustrates output of an automatic tagging system in accordance with embodiments of the invention.

FIG. 7 illustrates output of an automatic tagging system in accordance with embodiments of the invention. FIG. 7 shows knowledge learned through co-occurrence analysis and further processing of the results. Wikipedia resources with a solid boundary are part of the original description of the Pablo Picasso resource in DBpedia, which is a database of infoboxes generated from the Wikipedia database. Resources and relationships with a dashed boundary have been added by the correlator 140 of FIG. 1. Entities and tags are shown as oval nodes of the graph, and relationships are shown as vertex lines. The original infoboxes associate infobox_artist and persondata with Pablo Picasso. The correlator determined the mapping between persondata_placeofbirth from Wikipedia and LOCATION from the CONLL tag set. Further processing of the results can reveal that all entities with an artist infobox in this example are PERSONs.

Figure 8:
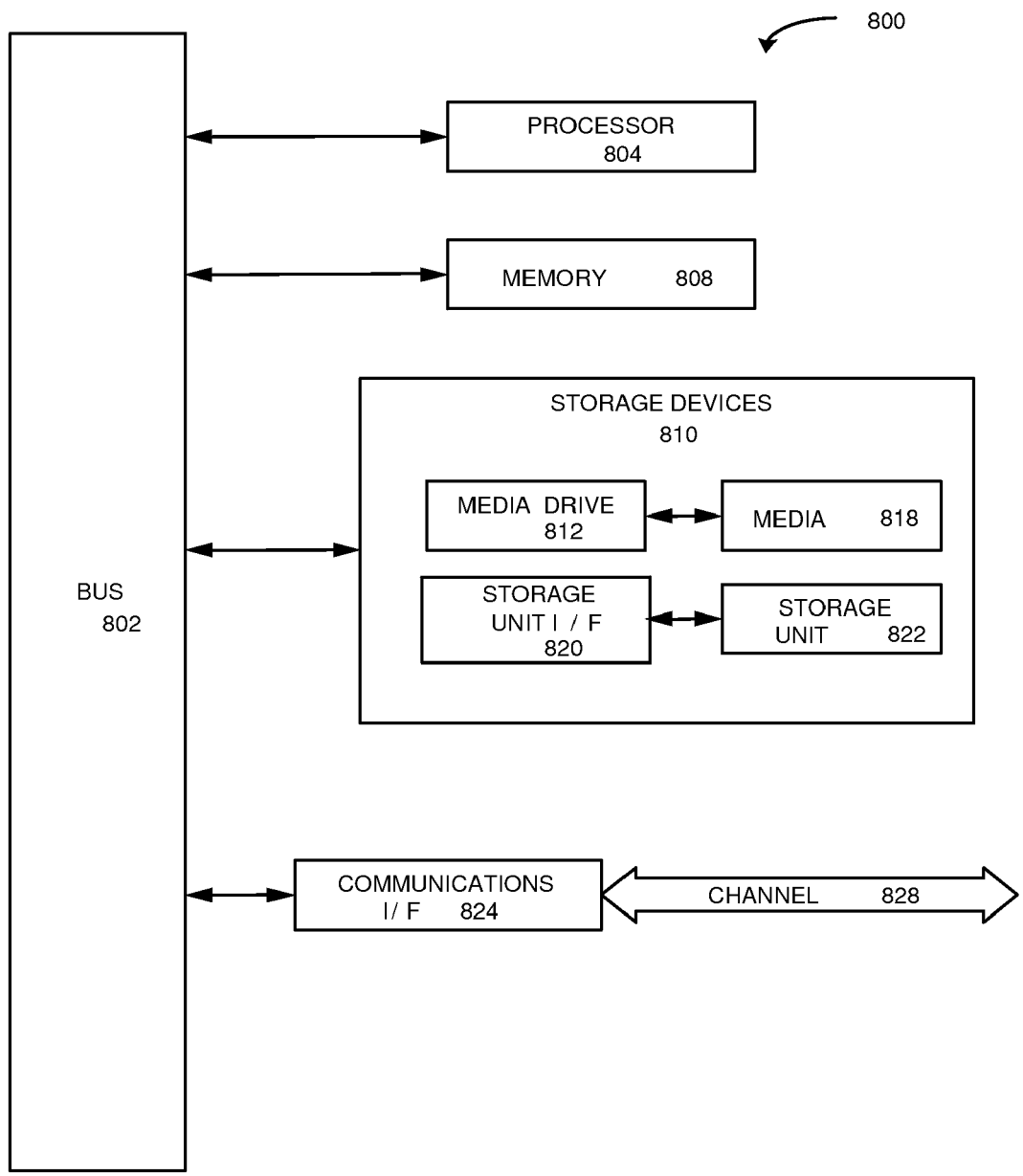
FIG. 8 illustrates a typical computing system that may be employed to implement processing functionality in embodiments of the invention.

FIG. 8 illustrates a typical computing system 800 that may be employed to implement processing functionality in embodiments of the invention. Computing systems of this type may be used in clients and servers, for example. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special purpose processing engine such as, for example, a microprocessor, microcontroller or other control logic. In this example, processor 804 is connected to a bus 802 or other communication medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory ("ROM") or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 818, may include, for example, a hard disk, floppy disk, magnetic tape, optical disk, CD or DVD, or other fixed or removable medium that is read by and written to by media drive 814. As these examples illustrate, the storage media 818 may include a computer-readable storage medium having stored therein particular computer software or data.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a USB port), a PCMCIA slot and card, etc. Software and data transferred via communications interface 824 are in the form of signals which can be electronic, electromagnetic, optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 808, storage device 818, or storage unit 822. These and other forms of computer-readable media may be involved in storing one or more instructions for use by processor 804, to cause the processor to perform specified operations. Such instructions, generally referred to as "computer program code" (which may be grouped in the form of computer programs or other groupings), when executed, enable the computing system 800 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 814, drive 812 or communications interface 824. The control logic (in this example, software instructions or computer program code), when executed by the processor 804, causes the processor 804 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate. It must also be noted that, as used in this specification and the appended claims, the singular forms "a," "an" and "the" include plural referents unless the context clearly dictates otherwise.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An apparatus comprising:
a processor;
a storage medium for tangibly storing thereon program logic for execution by the processor, the program logic comprising:
semantic tagging logic executed by the processor for causing generation of at least one first association that associates at least one standard tag with at least one first text fragment of a user-defined document, such that the semantic tagging logic is trained on a standard document annotated with at least one standard tag;
tag association logic executed by the processor for associating at least one first user-defined tag with at least one second text fragment of the user-defined document in response to the at least one second text fragment matching a value associated with the at least one first user-defined tag, to establish at least one second association; and
mapping logic executed by the processor for establishing a mapping between the at least one standard tag and the at least one first user-defined tag in response to existence of a requisite correlation between the at least one standard tag and the at least one first user-defined tag.

2. The apparatus of claim 1, wherein the requisite correlation exists if a number of times the at least one standard tag and the at least one first user-defined tag are both associated with a same text fragment is greater than a threshold.

3. The apparatus of claim 1, wherein the requisite correlation exists if a number of co-occurrences for a given tag is greater than a threshold fraction of a total number of co-occurrences, wherein a co-occurrence exists in response to the at least one standard tag and the at least one first user-defined tag both being associated with a same text fragment of the user-defined document.

4. The apparatus of claim 1, wherein the requisite correlation exists if a total number of co-occurrences is at least a threshold fraction of a number of occurrences in an occurrence set, wherein the occurrence set comprises occurrences of tags selected from a tag set, and a co-occurrence exists in response to the at least one standard tag and the at least one first user-defined tag both being associated with a same text fragment.

5. The apparatus of claim 1, wherein the requisite correlation exists if a total number of occurrences of tags selected from a tag set is at least a threshold value, wherein an occurrence exists in response to a standard tag being associated with a text fragment.

6. The apparatus of claim 1, wherein the requisite correlation exists if:
a number of co-occurrences for a given tag is greater than a threshold fraction of a total number of co-occurrences,
a total number of co-occurrences is at least a threshold fraction of a number of occurrences in an occurrence set, wherein the occurrence set comprises occurrences of tags selected from a tag set, and
a total number of occurrences of tags is at least a threshold value,
wherein a co-occurrence exists in response to the at least one standard tag and the at least one first user-defined tag both being associated with a same text fragment, and
an occurrence exists in response to a standard tag being associated with a text fragment.

7. The apparatus of claim 1, wherein the semantic tagging logic comprises a statistical tagger.

8. The apparatus of claim 7, wherein the statistical tagger implements a Hidden Markov Model trained with the average sequence perceptron algorithm.

9. The apparatus of claim 1, wherein the user-defined document comprises at least a portion of an online encyclopedia.

10. The apparatus of claim 9, wherein the at least one first user-defined tag comprises a property of the online encyclopedia, and the value associated with the at least one first user-defined tag comprises a value associated with the property of the online encyclopedia.

11. The apparatus of claim 1, wherein the standard document comprises a collection of hand-annotated documents.

12. The apparatus of claim 1, wherein the standard document comprises manually-labeled training data for named entity recognition.

13. The apparatus of claim 1, wherein the standard document comprises a CoNLL English Named Entity Recognition dataset, training data of a financial news collection, or a combination thereof.

14. The apparatus of claim 1, wherein the at least one standard tag comprises a Person tag, an Organization tag, a Location tag, a Miscellaneous tag, or a combination thereof.

15. The apparatus of claim 1, further comprising:
text selection logic executed by the processor for selecting from the user-defined document at least one tagged text fragment that is associated with at least one second user-defined tag; and
re-tagging logic executed by the processor for associating the at least one tagged text fragment with at least one standard tag associated by the mapping with the at least one second user-defined tag.

16. The apparatus of claim 15, further comprising:
re-training logic executed by the processor for providing the at least one tagged text fragment and the at least one standard tag associated by the mapping with the at least one second user-defined tag to the semantic tagging logic as training input.

17. The apparatus of claim 15, further comprising:
extension logic executed by the processor for extending the at least one tagged text fragment to include adjacent words to produce at least one extended text fragment in response to the adjacent words being no-stop words; and
null tagging logic for associating at least one word of the extended text fragment with a null tag in response to the at least one word being a no-stop word.

18. The apparatus of claim 17, further comprising:
re-training logic executed by the processor for providing the at least one extended text fragment and the association between the at least one word and the null tag to the tagger as training input.

19. An apparatus comprising:
a processor;
a storage medium for tangibly storing thereon program logic for execution by the processor, the program logic comprising:
text selection logic executed by the processor for selecting from a user-defined document at least one tagged text fragment that is associated with at least one user-defined tag, such that the at least one user-defined tag is selected from a mapping table that associates the at least one user-defined tag with at least one standard tag; and
tagger training text input logic executed by the processor for providing the at least one tagged text fragment and at least one standard tag associated by the mapping with the at least one user-defined tag to the tagger as training input.

20. The apparatus of claim 19, further comprising:
text extension logic executed by the processor for extending the at least one tagged text fragment to include adjacent words, in response to the adjacent words being no-stop words, to produce at least one extended text fragment;
extended text association logic executed by the processor for associating at least one word of the extended text fragment with a null tag in response to the at least one word being a no-stop word; and
tagger training extended text input logic executed by the processor for providing the at least one extended text fragment and the association between the at least one word and the null tag to the tagger as training input.

21. A non-transitory computer-readable storage medium for tangibly storing thereon computer readable instructions for a method comprising:
causing a semantic tagger to generate at least one first association that associates a first tag with a first portion of text,
such that the tagger is operable to select the first portion of text from the first collection of documents, the tagger is further operable to select the first tag from a first tag set, and the tagger is trained using training data that includes a second collection of documents annotated with the first tag set;
generating at least one second association that associates a second tag selected from a second tag set with a second portion of text selected from the first collection in response to the second portion of text matching a value associated with the second tag; and
establishing a mapping between the first tag and the second tag in response to existence of a requisite correlation between the first tag and the second tag.

22. The non-transitory computer-readable storage medium of claim 21, wherein the requisite correlation exists if a number of co-occurrences for at least one tag is greater than a threshold fraction of a total number of co-occurrences, wherein a co-occurrence exists in response to the first tag and the second tag both being associated with a same text fragment.

23. The non-transitory computer-readable storage medium of claim 21, further comprising instructions for:
   selecting a chunk of text from the first portion of text, wherein the chunk of text includes an entity name;
   identifying a user-defined tag associated with the entity name, wherein the user-defined tag is selected from the second set of tags;
   identifying a standard tag associated with the user-defined tag by the mapping; and associating the entity name with the standard tag.

24. The non-transitory computer-readable storage medium of claim 23, further comprising instructions for:
   providing the first portion of text and the standard tag to the tagger as training input.

25. The non-transitory computer-readable storage medium of claim 21, further comprising instructions for:
   extending the chunk of text to include at least one adjacent word in response to the at least one adjacent word being a no-stop word, to produce at least one extended chunk of text; and
   associating the at least one adjacent word with a null tag.

26. The non-transitory computer-readable storage medium of claim 25, further comprising instructions for: providing the at least one extended chunk of text and the association between the at least one adjacent word and the null tag to the tagger as training input.

27. A method comprising:
   causing, using a computing device, a semantic tagger to generate at least one first association that associates a first tag with a first portion of text,
   such that the tagger is operable to select the first portion of text from a first collection of documents, and the tagger is further operable to select the first tag from a first tag set, and the tagger is trained using training data that includes a second collection of documents annotated with the first tag set;
   generating, using the computing device, at least one second association that associates a second tag selected from a second tag set with a second portion of text selected from the first collection in response to the second portion of text matching a value associated with the second tag; and
   establishing, using the computing device, a mapping between the first tag and the second tag in response to existence of a requisite correlation between the first tag and the second tag.

28. The method of claim 27, wherein the requisite correlation exists if a number of times the at least one standard tag and the at least one user-defined are both associated with a same text fragment is greater than a threshold.

29. The method of claim 27, further comprising:
   selecting, using the computing device, a chunk of text from the first portion of text, wherein the chunk of text includes an entity name;
   identifying, using the computing device, a user-defined tag associated with the entity name, wherein the user-defined tag is selected from the second set of tags;
   identifying, using the computing device, a standard tag associated with the user-defined tag by the mapping; and
   associating, using the computing device, the entity name with the standard tag.

30. The method of claim 29, further comprising:
   providing, using the computing device, the first portion of text and the standard tag to the tagger as training input.

31. The method of claim 30, further comprising:
   extending, using the computing device, the chunk of text to include at least one adjacent word in response to the at least one adjacent word being a no-stop word, to produce at least one extended chunk of text; and
   associating the at least one adjacent word with a null tag.

32. The method of claim 31, further comprising:
   providing, using the computing device, the at least one extended chunk of text and the association between the at least one adjacent word and the null tag to the tagger as training input.

* * * * *